Figure 1:
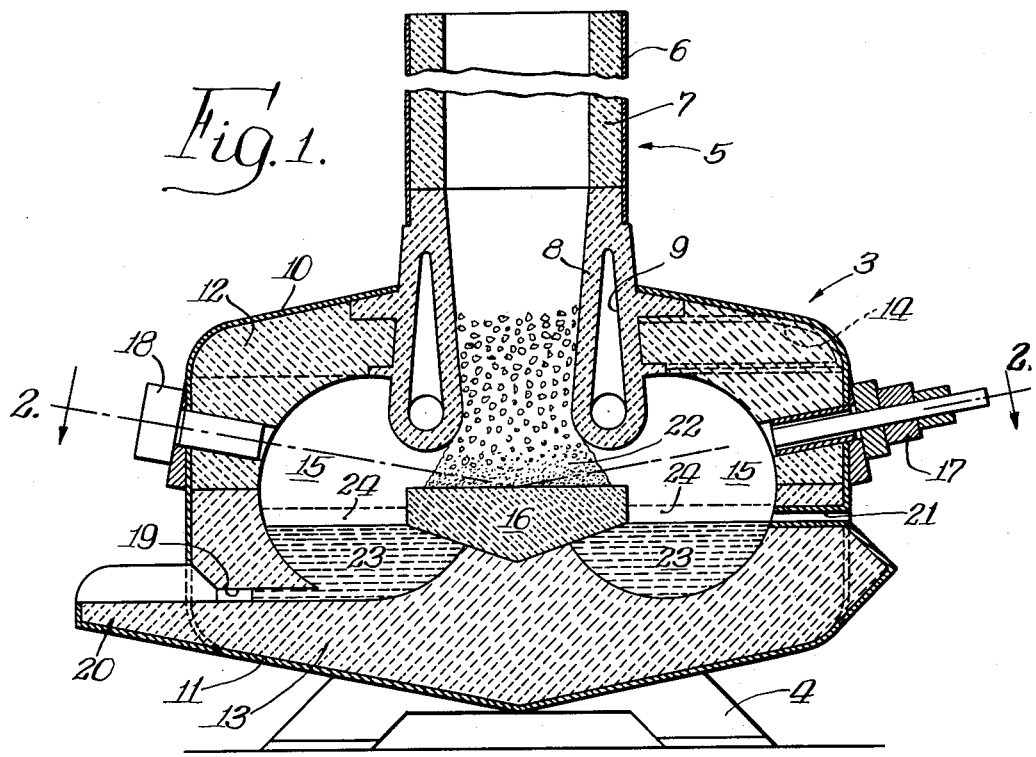

June 12, 1956 A. A. MORVAY 2,750,278
SMELTING PROCESS
Filed May 9, 1952

INVENTOR.
Anton A. Morvay
By Davis, Lindsey, Hibben & Noyes
Attys.

United States Patent Office 2,750,278
Patented June 12, 1956

2,750,278

SMELTING PROCESS

Anton A. Morvay, Chicago, Ill., assignor to Anton A. Morvay, Frederick B. Hinrichs, and Cornelius A. Ross, Chicago, Ill., as trustees Application May 9, 1952, Serial No. 286,969

5 Claims. (Cl. 75—40)

This invention relates to the smelting of metallic oxide ores and more particularly to a novel process and apparatus for the reduction of iron oxide-bearing materials to obtain iron therefrom.

The conventional method of processing iron oxide ore to obtain iron involves the use of the blast furnace wherein a mixture of iron ore, coke, and limestone in predetermined proportions is continuously introduced at the top of the furnace shaft and a blast of preheated air is passed upwardly in countercurrent relation to the downwardly moving column of solid charge. The oxygen of the air blast reacts with the carbon in the coke to form carbon monoxide which in turn reduces the iron oxide content of the ore to form iron. At the same time the limestone is decomposed to carbon dioxide and lime, the latter combining with the gangue of the ore and the ash of the coke to form slag.

However, the blast furnace is inherently an inefficient metallurgical device subject to many limitations and disadvantages.

For example, it is well known that in the blast furnace a series of reactions occur in more or less well defined zones of the furnace. With respect to the oxygen introduced through the air blast, the lower section of the furnace above the tuyeres is essentially a high temperature gas producer or converter wherein oxygen is converted to carbon monoxide by reaction with hot carbon. With respect to the iron ore, the upper portion of the furnace shaft is essentially a reduction zone wherein iron oxide is reduced to iron at temperatures substantially lower than in the lower portion of the furnace. As the ore containing reduced iron passes downwardly into the lower regions of the furnace, the iron is heated and eventually melted and released from the gangue which combines with lime from the limestone to form slag. Thus, the upper portion of the blast furnace is primarily an iron oxide reduction zone, the central portion of the furnace is a heating zone, and the lower portion of the furnace is a gas converter and melting zone.

Obviously, therefore, the fundamental smelting objectives of reducing the ore and then releasing the reduced iron by melting are carried out in relatively independent regions of the blast furnace in an essentially stepwise or sequential manner extending over a substantial period of time. In addition, the formation of the necessary reducing gas is also carried out inside the blast furnace with the result that a complex and inefficient reaction system prevails inside the furnace which is not subject to the close control ordinarily desired in a commercial process.

Other disadvantages of the conventional blast furnace operation are found in the fact that coke or like carbon-containing fuel is charged in admixture with the iron ore and limestone. As a result, the iron formed in the process contains large amounts of carbon and substantial quantities of other impurities such as sulfur which are contained in the coke. Moreover, the countercurrent flow system in the blast furnace places a definite limitation on the permissible particle size of the solid charge. Obviously, the particle size of the charge must be great enough to permit passage of the gases upwardly through the bed at reasonable gas pressures at the tuyeres. Attendant upon the relatively large particle size requirements for the solid charge to the blast furnace is the further disadvantage that the larger ore particles require substantially greater heating to effect separation of the reduced iron from the gangue.

From an economic viewpoint the blast furnace is of limited utility because the equipment required is very large in physical size representing a huge capital investment. Moreover, the blast furnace also requires a metallurgical coke plant as an operating adjunct with the result that a complete installation can be justified only for large tonnage capacities and can be afforded only by those with large capital resources. Consequently, the blast furnace has become primarily an instrument for large production in areas conveniently located to coking coal fields and markets thus accounting for the localized concentration of the steel industry. A further important disadvantage of the blast furnace is the fact that it is not feasible for use with low grade or marginal ores of which there are large deposits representing a vast unexploited source of iron and steel.

It is a primary object of my invention to provide a novel and simplified means for the smelting of iron ore and other metallic oxide ores.

A further object of the invention is to provide an improved process and apparatus for recovering iron from iron oxide ores, which overcome to a large extent the disadvantages and limitations of the conventional blast furnace.

Another object of the invention is to provide a novel iron oxide ore reduction technique which substantially eliminates the stepwise or sequential reaction scheme which is characteristic of the conventional blast furnace.

Still another object of the invention is to provide a novel process for the recovery of iron from iron oxide ores which results in a product having a higher degree of purity than pig iron from a blast furnace.

An additional object of the invention is to provide a novel smelting process for the reduction of metallic oxide ores which does not rely on the in situ formation of a reducing gas.

Another object of the invention is to provide a novel iron oxide ore reduction process which is adapted for use with a wide variety of ores including low grade or marginal ores, which can handle the ore in relatively small particle size, and which does not involve a countercurrent flow relation between the solid charge and a reducing gas as in the conventional blast furnace.

A further object of the invention is to provide a novel smelting apparatus which is characterized by its relatively small size and substantially lower initial cost as compared with the blast furnace.

Figure 2:
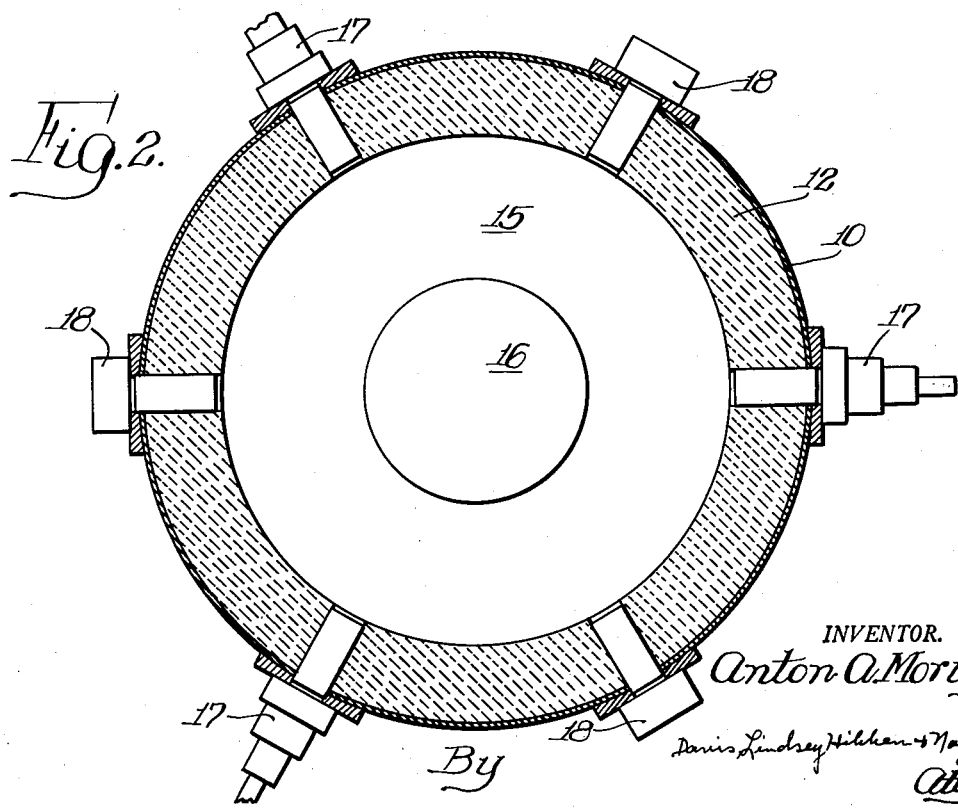

Other objects and advantages of the invention will become apparent from the subsequent detailed description taken in conjunction with the accompanying drawing, wherein:

Fig. 1 is a vertical sectional view of one specific form of apparatus which may be used in practicing my invention; and Fig. 2 is a horizontal sectional view of the apparatus as seen along the line 2—2 of Fig. 1.

Referring now to the drawing, one specific embodiment of an apparatus which may be used in practicing my invention is shown by way of illustration. The apparatus comprises generally a furnace section 3 having a suitable footing or support 4 and an upright shaft or stack portion 5. It will be understood that the shaft 5 may extend to any desired elevation above the furnace 3, but for the sake of convenience the mid-portion of the shaft is broken away in Fig. 1 of the drawing. The shaft 5 has an outer steel shell 6 and an inner refractory lining 7. As will be clearly seen from Fig. 1, the upper end of the shaft 5 is open to permit continuous introduction of the solid charge materials, and the lower end of the shaft converges to provide a restricted throat or Venturi outlet 8 extending into the furnace section 3. The Venturi section 8 is provided with suitable interior cooling means, such as the hollow passageways 9, to permit the circulation of a cooling medium such as water.

The furnace section 3 is generally circular in cross-section and comprises upper and lower steel shells, indicated at 10 and 11 respectively, which are lined with suitable refractory linings, as at 12 and 13. It will be understood that the furnace is also provided with a suitable internal supporting structure or framework, as indicated partially at 14, for securing the furnace lining in place and for mounting the stack 5. The interior of the furnace 3 is constructed to provide an open zone 15 having a generally toroidal or doughnut-shaped configuration. A hearth block 16, preferably of graphite, is supported at the center of the zone 15 in elevated relation above the bottom of the zone 15 and in spaced relation below the outlet 8 of the shaft 5. Although the zone 15 is substantially toroidal in form as illustrated in the drawing, the exact configuration may be varied somewhat as long as there is a generally annular confined space surrounding the hearth 16 and extending above and below the hearth.

A plurality of burners 17, three being shown in this instance, are mounted in circumferentially spaced relation around the upper portion of the furnace section 3. The burners 17 are directed downwardly at a slight angle to facilitate impingement of the burner flames against the upper surface of the hearth 16, as hereinafter described in detail. A plurality of blast gates or gas control units 18 are likewise mounted around the upper portion of the furnace section 3 in circumferentially spaced and alternating relation with the burners 17. A tap hole 19 is provided in the lower portion of the furnace and communicates with the bottom of the zone 15 for drawing off molten metal through a suitable spout 20. A generally similar slag draw-off or tap hole 21 is also provided in the side of the furnace 3 and communicates with the central portion of the zone 15 for removing slag.

The operation of the process will now be described with relation to the processing of iron oxide ore, but it should be understood that the apparatus and method are also applicable to the processing of various other metallic oxide ores such as those of copper, lead, zinc, titanium, etc. In my process, the solid charge materials comprising a mixture of subdivided particles of iron oxide ore and a suitable fluxing agent, such as limestone, are introduced more or less continuously into the open upper end of the shaft 5. The important novel aspect of the process at this point resides in the fact that no coke or other source of carbon is introduced with the solid materials charged to the shaft 5. It will be apparent that this is in marked contrast to the conventional blast furnace operation wherein the solid charge contains coke or other carbonaceous fuel in addition to the iron ore and limestone.

During the operation of the process the shaft 5 is substantially filled with the mixture of iron oxide ore and limestone, and this confined column of charge materials flows downwardly by gravity through the restricted outlet or throat 8 and onto the upper surface of the hearth 16 as indicated at 22 in Fig. 1. The burners 17 are supplied with air and pulverized coal, and the combustion of the coal in the burners is regulated to obtain a high temperature flame and a combustion gas rich in carbon monoxide. As will be clear from Fig. 1, the flames from the burner 17 are thus directed into contact with the solid charge materials as the latter are continuously fed in successive increments onto the hearth 16. The atmosphere in the zone 15 surrounding the hearth 16 consists essentially of the carbon monoxide-containing combustion gases formed in the burners 17. By means of the blast gates 18, or other suitable pressure control means, the reducing gas atmosphere in the zone 15 is maintained under a slight superatmospheric pressure which may be on the order of from about 1 to about 5 pounds per square inch although a pressure of from about 1 to about 2 pounds per square inch is ordinarily adequate. The flame temperature from the burners 17 may be within the range from about 3000° F. to about 4000° F.

Under the simultaneous effect of the reducing atmosphere in the zone 15 and the high temperatures of the burner flames, the iron oxide ore particles in the solid charge material on the hearth 16 are rapidly reduced to iron which is then rapidly melted. The molten iron flows from the hearth 16 and collects in the lower annular trough portion of the zone 16, as indicated at 23. Under the high temperatures prevailing in the reaction zone on the hearth 16, the limestone in the solid charge is rapidly decomposed to form lime which combines with the gangue of the ore to form a fluid slag in the manner well understood by those skilled in the smelting art. The slag also flows from the hearth 16 and forms a separate layer 24 above the molten iron 23. As required during the process, the molten iron 23 is withdrawn through the tap hole 19 and the spout 20, and the slag layer 24 may likewise be tapped through the hole 21 as desired.

It will be recognized that the fundamental chemical reactions in the above-described process are essentially the same as in the blast furnace or other smelting process involving the reduction of a metallic oxide ore. In other words, the iron oxide content of the ore is converted to iron by reaction with a reducing gas, the reduced iron being melted by high temperatures, and the gangue of the ore is combined with lime to form a fluid slag which can be readily removed. However, aside from the fundamental nature of the chemical reactions involved, my process differs greatly from the conventional blast furnace. The most significant difference is found in the fact that in my process the reduction of the iron oxide to iron and the melting of the resultant iron are both carried out more or less simultaneously in the same localized reaction zone, whereas in the blast furnace the reduction of the iron oxide takes place in the upper portion of the furnace and the application of high temperatures to effect melting of the reduced iron takes place only in the lower portion of the blast furnace. In the present process, the solid charge materials are subjected to the simultaneous action of a reducing atmosphere and high temperatures in a combined reducing and melting zone so that the reduction of the iron ore and the melting of the iron are carried out in a highly efficient and substantially concurrent manner as compared with the stepwise and physically separated reaction scheme of the conventional blast furnace.

A further outstanding difference in the present process as compared with the blast furnace is the elimination of the principle of countercurrent flow. As discussed above, in the blast furnace the reducing gas is formed in the lower portion of the furnace and passes upwardly in contact with the downwardly moving bed of solid charge materials so that reduction of the iron oxide in the ore takes place over a considerable portion of the travel of the bed through the upper half of the blast furnace shaft. In my process no significant amount of gas is allowed to pass upwardly through the moving column of solid charge materials, but on the contrary the reducing gas atmosphere is confined to the zone 15. The pressure within the zone 15 and the removal of gas therefrom when necessary are controlled by means of the blast gates 18 or other suitable automatic pressure control equipment. Consequently, it is an important feature of my invention that the particle size of the solid charge materials introduced into the shaft 5 must be small enough to provide an effective gas seal for the shaft 5 under the maximum gas pressure contemplated in the zone 15. In the blast furnace a relatively coarse solid charge is required, e. g. on the order of 3 inches to 5 inches minimum particle size, in order to provide the required space or voids through which the air blast may pass. If fine materials are charged in the blast furnace, it is impossible to blow air through the material in a satisfactory manner. In contrast to the blast furnace, the charge introduced to the shaft 5 in my process has a relatively small particle size, for example, about ⅜ inch or less and not over about 1 inch as a maximum.

It will be apparent that by charging relatively fine solid materials as just described, the downwardly moving solid bed effectively seals the restricted throat or Venturi 8 of the shaft 5 so that it is impossible in my process for any substantial amount of gas to pass upwardly through the shaft 5 under the pressures contemplated within the zone 15. Consequently, the upper end of the shaft 5 may be open and unobstructed thus eliminating the need for the elaborate bell and hopper arrangement commonly employed in charging a blast furnace or the like. Another important advantage which is realized because of the relatively fine solid charge utilized in my process is the greater speed of the reduction reactions as compared with similar reactions carried out on large particle size ore. The rate of the reduction reactions is dependent, among other factors, upon the intimacy of the contact of the iron ore with the reducing gas. With the relatively fine material utilized in my process, it will be apparent that the desired intimate contact is greatly facilitated and hence the reaction rate is much more rapid. In addition, the maintenance of the reducing gas under super-atmospheric pressure in the zone 15 also promotes rapid penetration of the gas into the ore particles thereby further enhancing the intimacy of contact and the speed of the reduction reactions. A further factor which contributes to a faster reaction rate is the high temperatures which prevail in the reducing zone, especially when taken in conjunction with the high degree of control over the $CO/CO_2$ ratio in the reaction zone, as hereinafter described.

In the blast furnace the carbon introduced with the solid charge not only provides the reducing gas by reaction with oxygen in the air blast but also serves as the internal fuel for decomposing the limestone and melting the reduced iron. However, I have found that this is a vastly inefficient utilization of the heating value of the coke or other carbonaceous fuel introduced in the blast furnace charge. As hereinbefore mentioned, the control over the combustion of carbon in the blast furnace is incomplete and inadequate at best and, furthermore, a relatively large proportion of the heating value of the fuel in the blast furnace is required for the purpose of breaking down the much larger particles of ore and releasing the reduced iron therefrom. In my process the full heating value of the coal or other carbonaceous fuel is utilized by effecting combustion of the coal under carefully controlled conditions and supplying the resultant heat and combustion gases directly to a localized and relatively confined reaction zone. Obviously, the burners 17 are subject to a high degree of control so that substantially 100% carbon monoxide may be supplied to the zone 15 as the reducing gas. In addition, by proper regulation of the burners the combustion gases may be controlled to provide any desired ratio of carbon monoxide to carbon dioxide in the reducing atmosphere in the zone 15. Thus, my process is characterized by a high degree of thermal efficiency in the utilization of the fuel and by a high degree of control over the $CO/CO_2$ ratio in the furnace gases.

In addition to carbon monoxide, it is within the scope of my invention to introduce a suitable reducing gas comprising hydrogen or a mixture of hydrogen and carbon monoxide. For example, by the use of oil burners instead of pulverized coal burners, I can provide a reducing atmosphere in the zone 15 containing both hydrogen and carbon monoxide. As an alternative procedure, I may also form a mixture of carbon monoxide and hydrogen by the decomposition of steam externally of the furnace 3, the resultant mixture then being introduced into the atmosphere in the zone 15.

By the elimination of coke or other solid carbonaceous fuel from the solid materials charged to the reaction zone, it will be seen that my process is capable of producing iron having a much lower carbon content than the pig iron product of the blast furnace. For example, whereas ordinary pig iron obtained from a blast furnace contains from 3.5 to 4.5% carbon, my process is capable of producing iron having less than 1% carbon. Obviously, such a low carbon content iron greatly simplifies the subsequent refining processes which must be carried out to convert the iron to steel. In addition to minimizing the carbon content of the iron, the elimination of coke from the solid materials charged to my process also avoids the introduction of sulfur and other impurities or inclusions commonly found in metallurgical coke. Thus, the metallic product of my process is much purer than any product heretofore available from a smelting process.

With respect to the smelting of iron ore, which is one of the most important but not the only application of my process, any of the common iron oxide ores such as hematite, magnetite and limonite may be employed. However, a highly important advantage of my process is the fact that it is adaptable for use with low grade or marginal ores which are not ordinarily utilized on a commercial scale. Because of the high efficiency of my process and the greatly reduced capital investment required for the necessary equipment, the apparatus of the present invention can be readily constructed at any desired location and the low grade or marginal ores can be processed even though the yield of iron from such ores would normally be so low as to be economically unfeasible for blast furnace operation. As an example of typical low grade or marginal ores which can be readily employed in my furnace, reference is made particularly to the iron bearing sands which are found in abundant supply in various localities of the world. By way of illustration, the material known as "black sands" containing a complex finely eroded mixture of chromite, magnetite, ilmenite, etc. can be readily used in my process. The "black sands" are first treated to separate magnetite in finely divided form which can then be charged directly to my process without the necessity of sintering or agglomerating the same. Such finely divided ore could not be used in the blast furnace wtihout first being subjected to an expensive sintering treatment to obtain the necessary large size particles required for successful blast furnace operation.

Although the invention has been described above with particular reference to a specific form of apparatus and primarily with reference to the processing of iron oxide ores, it is to be understood that various alternatives and modifications may be resorted to without departing from the scope of the invention as defined in the appended claims.

I claim:

1. A smelting process which comprises maintaining a confined column of a substantially carbon-free mixture of relatively small particles of a metallic oxide ore and a fluxing agent, feeding said mixture downwardly into a confined zone, introducing a reducing gas into said zone and maintaining the same under superatmospheric pressure, and simultaneouslly heating the mixture fed into said zone whereby to effect substantially concurrent reduction of the metallic oxide and melting of the resultant metal, said mixture having a particle size sufficiently small so that said gas cannot pass upwardly through said column whereby reduction of said oxide is effected solely within said reaction zone and not within said column.

2. A smelting process which comprises maintaining a confined column of a substantially carbon-free mixture of relatively small particles of iron oxide ore and limestone, feeding said mixture downwardly into a confined reaction zone, introducing a reducing gas into said zone and maintaining the same under superatmospheric pressure, and simultaneously heating the mixture fed into said zone whereby to effect substantially concurrent reduction of the iron oxide and melting of the resultant iron, said mixture having a particle size sufficiently small so that said gas cannot pass upwardly through said column whereby reduction of said oxide is effected solely within said reaction zone and not within said column.

3. The process of claim 2 further characterized in that the particle size of said mixture is not more than about 1 inch and the pressure within said reaction zone is from about 1 to about 5 pounds per square inch.

4. A smelting process which comprises maintaining a confined downwardly flowing column of a substantially carbon-free mixture of relatively small particles of metallic oxide ore and a fluxing agent, discharging said column into an enlarged confined reaction zone and feeding the mixture onto a hearth disposed in said zone in spaced relation below the bottom of said column, introducing a reducing gas into said zone and maintaining the same under superatmospheric pressure, simultaneously directing a plurality of high temperature flames generally radially against the mixture fed onto said hearth whereby to effect substantially concurrent reduction of the metallic oxide and melting of the resultant metal, the particle size of said mixture being sufficiently small so that said gas is prevented from passing upwardly through said column whereby reduction of said oxide is effected solely within said reaction zone and not within said column, and withdrawing molten metal and slag from said reaction zone below said hearth.

5. A smelting process which comprises maintaining a confined downwardly flowing column of a substantially carbon-free mixture of relatively small particles of iron oxide ore and limestone, discharging said column into an enlarged confined reaction zone and feeding the mixture onto a hearth disposed in said zone in spaced relation below the bottom of said column, introducing a reducing gas into said zone and maintaining the same under superatmospheric pressure, simultaneously directing a plurality of high temperature flames generally radially against the mixture fed onto said hearth whereby to effect substantially concurrent reduction of the iron oxide and melting of the resultant iron, the particle size of said mixture being sufficiently small so that said gas is prevented from passing upwardly through said column whereby reduction of said oxide is effected solely within said reaction zone and not within said column, and withdrawing molten iron and slag from said reaction zone below said hearth.

References Cited in the file of this patent

UNITED STATES PATENTS

| Number | Name | Date |
|---|---|---|
| 64,353 | Nohl | Apr. 30, 1867 |
| 510,430 | McCarty | Sept. 3, 1889 |
| 903,425 | Witting et al. | Nov. 10, 1908 |
| 1,466,644 | Franchot et al. | Aug. 28, 1923 |
| 1,735,293 | Murakami | Nov. 12, 1929 |
| 1,889,160 | Strain et al. | Nov. 29, 1932 |
| 1,944,874 | Brassert | Jan. 30, 1934 |
| 1,948,697 | Brassert | Feb. 27, 1934 |
| 2,283,163 | Brassert et al. | May 19, 1942 |

OTHER REFERENCES

Metals Review, October 1948, page 3.